United States Patent [19]

Lundin

[11] Patent Number: 4,673,497

[45] Date of Patent: Jun. 16, 1987

[54] OIL-SPILL-COMBATTING WATER CRAFT

[75] Inventor: Lars Lundin, Porvoo, Finland

[73] Assignee: Oy Lars Lundin Patent Ab, Porvoo, Finland

[21] Appl. No.: 680,454

[22] Filed: Dec. 11, 1984

[30] Foreign Application Priority Data

Dec. 21, 1983 [FI] Finland .................................. 834705

[51] Int. Cl.$^4$ ...................... B01D 17/032; E02B 15/04
[52] U.S. Cl. ................................ 210/242.3; 210/923; 405/60
[58] Field of Search .................. 210/242.3, 242.4, 923, 210/924; 405/60

[56] References Cited

U.S. PATENT DOCUMENTS

| | | | |
|---|---|---|---|
| 3,684,095 | 8/1972 | Ayers ................................ | 210/242.3 |
| 4,067,811 | 1/1978 | Dallamore ........................... | 210/923 |
| 4,264,450 | 4/1981 | Ayers et al. ....................... | 210/242.4 |
| 4,473,469 | 9/1984 | Ayroldi ............................. | 210/242.3 |
| 4,510,054 | 4/1985 | Wylie ............................... | 210/923 |
| 4,530,760 | 7/1985 | Shimura ............................. | 210/923 |

Primary Examiner—Richard V. Fisher
Assistant Examiner—Wanda L. Millard
Attorney, Agent, or Firm—Pennie & Edmonds

[57] ABSTRACT

An oil-spill-combatting water craft is provided with at least one protruding boom but most suitably one on each side of the craft, the booms directing surface water and oil present in it into a conduit inside the craft, the inlet and the outlet of the conduit being located in the side of the craft. The purpose is to provide a simple, high-capacity arrangement in which the flow is, nevertheless, relatively calm also when the sea is rough. With this in mind, the conduit has been implemented as a circulation conduit the outlet of which is situated towards the bow from the inlet and in which the water flows automatically owing to the water-raising and water-guiding effect of the boom. The separating means for water and oil, fitted inside the conduit, is a rotating arrangement which allows water to flow through and is, for example, made up of rows of bristles. In front of the outlet of the conduit there is fitted a baffle which extends obliquely outwards and backwards.

8 Claims, 3 Drawing Figures

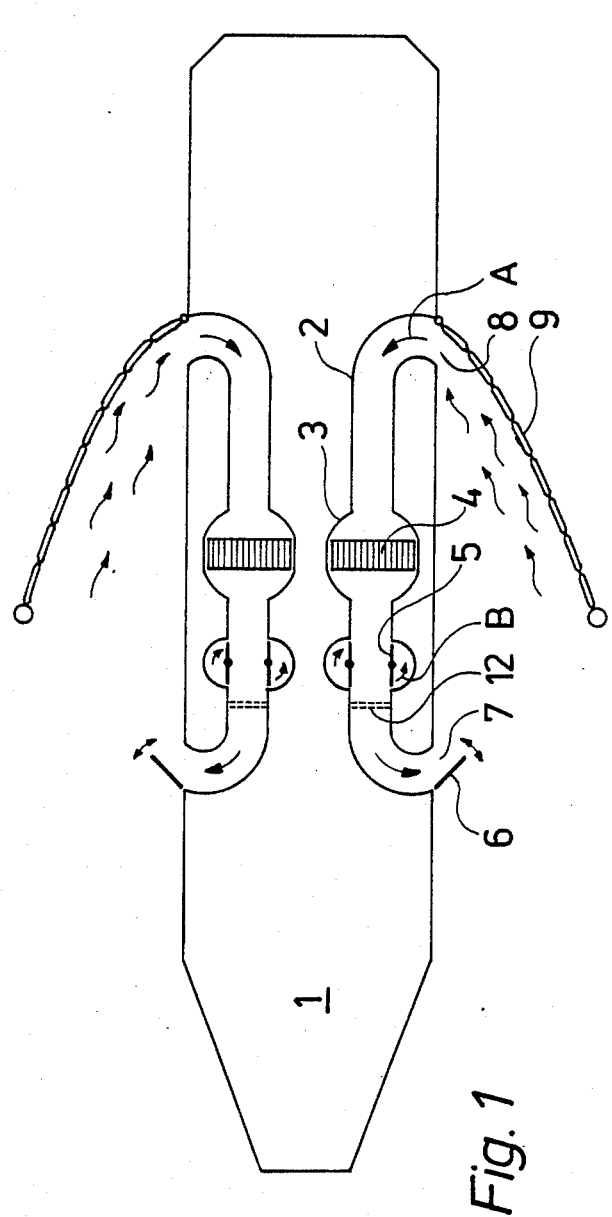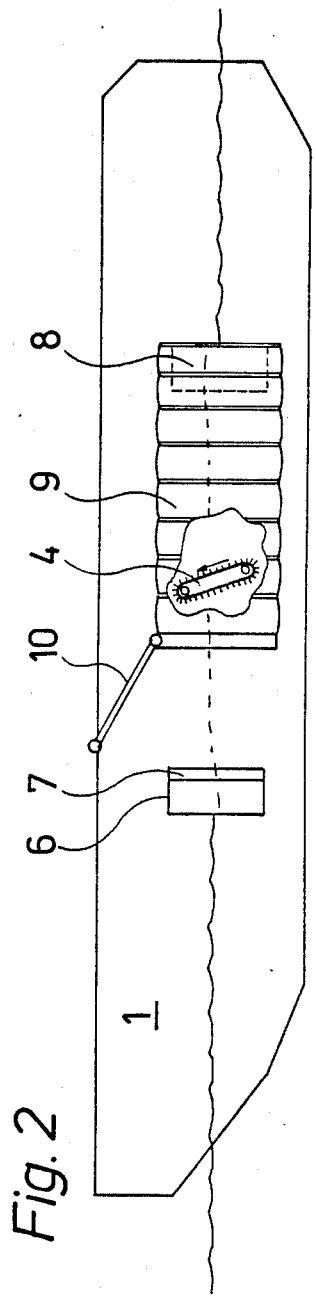

OIL-SPILL-COMBATTING WATER CRAFT

BACKGROUND OF THE INVENTION

1. Field of the Invention

The present invention relates to an oil-spill-combatting water craft of the type provided with at least one boom or the like protruding forwards and outwards from the water craft, at least one conduit inside the water craft and having its inlet and outlet being most suitably situated on the side of the water craft, the end of the boom being secured next to the inlet in such a way that, when the water craft travels on water, the boom directs surface water into the said conduit, in which, furthermore, there are fitted means for separating the inflowing water from the oil present in it.

2. Description of the Prior Art

In water craft in which oil-contaminated water is directed to inside the water craft by means of a boom, it is known to separate oil from the water by means of large-sized pumps. These arrangements have, however, a disadvantage in their relatively expensive structure and their low capacity. One improvement to this is, for example, the device presented in U.S. Pat. No. 4,061,569, in accordance with the preceding preamble, in which booms situated on the two sides of a water craft are used to direct oil-containing water into conduits situated on both sides of the craft. Oil is recovered by means of a moving belt which extends partly under the water and to which the oil adheres.

One of the disadvantages of this known system is that, when traveling at a suitable speed and on calm sea, this known device will probably work in the desired manner, but on rougher sea the waves and breakers will substantially disturb through-flow in the conduit. Depending on the travel speed and the quantity of the oil, it is also possible that there will still be oil in the water discharging from the conduit.

SUMMARY OF THE INVENTION

It is an object of the present invention to provide an arrangement of the type mentioned in the preamble, but in such a way that the disadvantages mentioned above can be avoided. In order to achieve this, the invention provides a water craft of the character once described, which comprises:

a hull;

at least one water inlet located at the water level in the side of the hull;

at least one oil boom or similar protruding forwards and outwards from the hull and attached next to the water inlet in such a way that, when the water craft travels on the water, surface water is directed by the boom into said water inlet;

at least one water outlet located at the water level in the side of the hull at a position forwards from the water inlet; a conduit providing a communication between said water inlet and said water outlet, said conduit curving smoothly at each end in order that water circulation therethrough be produced by the water-raising and water-guiding effect of the boom when the water craft travels forwards; and means provided in said conduit for separating oil from the surface water directed into the conduit, said means allowing for relatively obstacle-free through-flow of water.

In practice it has been seen that even at a speed as low as 2–3 knots the boom raises the water surface by over half a meter, which suffices to produce by itself an even and calm circulation of liquid in the circulation conduit. The circulation of the liquid can be promoted most suitably by mechanical means which in their resting position do not disturb the flow. It is also essential that the means for separating the water and the oil are highly permeable to water so that the amount of liquid flowing through will be large enough. One suitable separating device is, for example, a continuously rotating arrangement provided with bristles, of the type presented in FI Patent Application No. 832079, published Dec. 10th, 1984, which application is appended to this specification by way of reference.

BRIEF DESCRIPTION OF THE DRAWINGS

FIG. 1 is a diagrammatic top view of an oil-spill-combatting water craft,

FIG. 2 is a diagrammatic side view of the water craft, and

DESCRIPTION OF THE PREFERRED EMBODIMENTS

Figure 3:
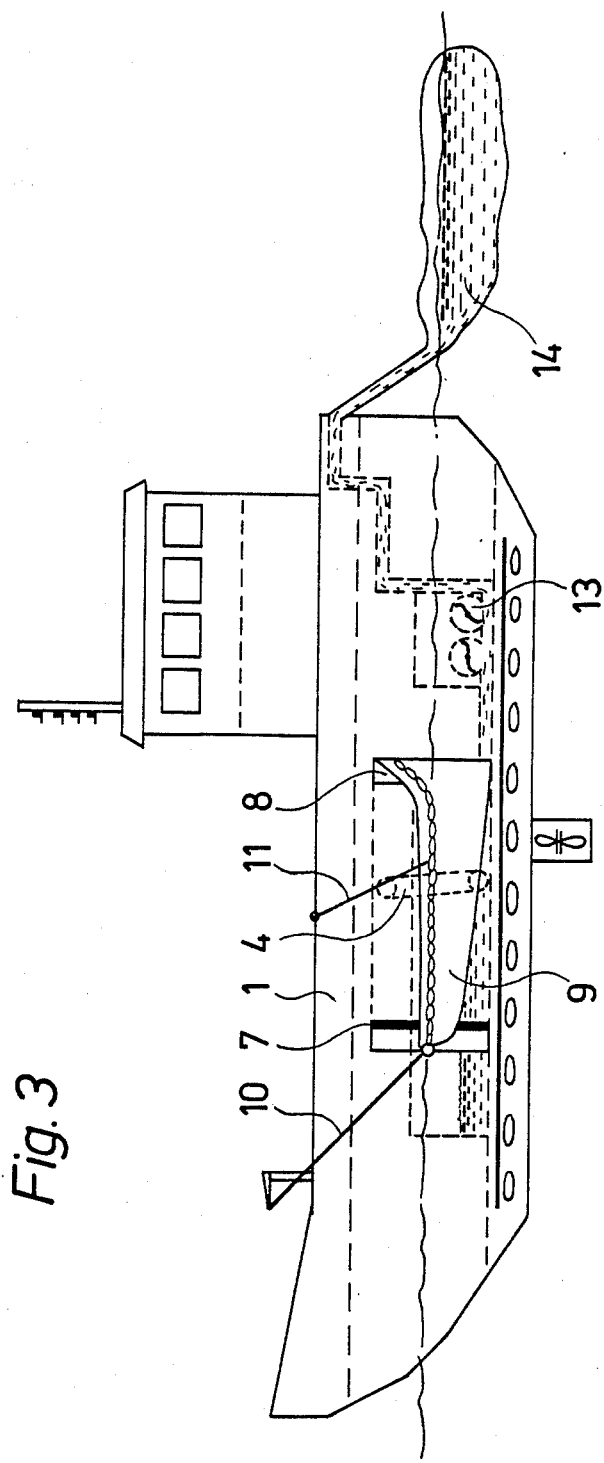
FIG. 3 depicts a side view of one practical embodiment.

In the figures the hull of the water craft is indicated by reference numeral 1. In the craft there are arranged, symmetrically on both sides, through-flow conduits 2, which are smoothly curved at the inlet 8 and at the outlet 7. The central sections 3 of the conduits 2 are widened, and in the widened area there is installed a separating means 4 for water and oil, the means being most suitably an arrangement such as described in FI Patent Application No. 832079. It is essential that the separating means allows water to flow through.

In order to promote through-flow of water, especially as the craft is traveling slowly or standing still, there are propellers 5 in the conduit 2; the direction of rotation of the propellers is indicated by arrow B and the propellers are preferably twobladed in such a way that in their resting position the blades are flush with the conduit wall. Furthermore, there is fitted in the conduit 2 a blow-back valve 12, made up of, for example, turning blades.

The flow is directed further by means of a controllable baffle 6 attached to the front edge of the outlet 7, the baffle 6 extending across the entire height of the outlet. The baffle 6 in part also serves as a breakwater for the water flowing into the inlet 8.

The booms 9 which collect oil-containing surface water extend in a known manner diagonally forwards and outwards and are secured to the side of the water craft by means of a boom 10 and a rope 11 (FIG. 3).

When the craft if traveling forwards the boom 9 directs oil-containing water towards the inlet 8, and when the surface of the liquid rises there automatically begins a flow in the direction indicated by arrow A. The deflection caused by the smooth curve of the conduit tends to calm down the flow and to dampen the breakers on rough sea. The flow is further promoted by the baffle 6. The rotating arrangement 4 separates and recovers oil, which is removed from the arrangement continuously by methods known per se. If there is still oil present in the water at a point subsequent to the arrangement 4, this water is recycled after emerging from the outlet 7.

In the area of the arrangement 4 the conduit 2 is widened, as shown in area 3. It is evident that also a mutual widening can be arranged for the conduits. What is important is that liquid can flow well and freely in the conduit 2 and that it can also flow relatively without hindrance through the separating means 4. It is also important that, owing to the widening 3, the water flow calms down further and the recovery of the oil is facilitated. A suitable separating means is an arrangement assembled from bristled pieces such as described in the above-mentioned earlier patent application. It is placed in water in a somewhat inclined position, as shown in FIG. 2, in which part of the boom 9 has been sectioned in order to depict the system diagrammatically. FIG. 2 does not show the conduit inside the water craft; the conduit may have a rectangular cross section and the same height as the openings 7, 8.

FIG. 3 depicts an example of how the oil can be removed from the water craft. By means of the pumps 13 the oil is pumped into a floating rubber container 14, which can be detached and replaced.

It is evident that the embodiment described can be varied in many ways within the idea of the invention. The height of the openings 7, 8 can be adjustable, according to the circumstances, by means of hatches covering them partly. Likewise, of course, the attachment of the boom can be adjustable. It is, of course, important that the boom and the inlet are located at such a height that unnecessary water is not collected but, on the other hand, notable amounts of oil cannot escape from under the boom.

What is claimed is:

1. An oil-spill-combatting water craft, for travelling along a water surface and removing oil floating thereon, which said craft comprises a hull, a bow and a stern and two sides extending longitudinally between said bow and stern;
   at least one water inlet located in one side of the hull at the water level at which the craft floats on the water surface;
   an oil boom protruding from said one side in a direction forwards towards the bow and outwards from the hull and attached thereto next to the water inlet on the stern side thereof, said boom having a lower portion submerged in the water and an upper portion above the water level for directing surface water into said water inlet when the water craft travels on the water with the bow headed in the direction of travel;
   at least one water discharge outlet located in said one side of the hull at a position forwards towards the bow from the water inlet; a conduit providing a communication between said water inlet and said water outlet, said conduit extending generally longitudinally of said craft at a location spaced inwardly from said side and curving smoothly at each end to connect with said inlet on the stern side thereof and with the outlet on the bow side thereof in order that water circulation therethrough be produced by the water-raising and water-guiding effect of the boom when the water craft travels forward; and
   means provided in said conduit for separating oil from the surface water directed into the conduit.

2. A water craft according to claim 1, further comprising a flow guide baffle extending obliquely outwards and backwards from said one side towards the stern and positioned immediately adjacent and on the bow side of the water discharge outlet.

3. A water craft according to claim 1, wherein said means for separating water and oil consists of a rotating brush means extending across the entire width of the conduit, said brush means being constructed with free through-flow gaps and with bristles.

4. A water craft according to claim 3, wherein the conduit is widened in the area of said brush means.

5. A water craft according to claim 1, further comprising mechanical, flow-producing power means fitted in the conduit in order to promote the through-flow of surface water.

6. A water craft according to claim 5, wherein said conduit is of substantially rectangular cross section and the mechanical power means consists of propellers situated on two opposite walls of the conduit, the propellers having rotating shafts which are substantially positioned at the plane of the wall and the propellers having two blades mounted on said shafts for rotation therewith and extending in radially opposite directions for selective alignment with the conduit wall when not rotating.

7. A water craft according to claim 1 comprising two booms and two circulation conduits arranged symmetrically on both sides of the water craft.

8. An oil-spill-combatting water craft, which comprises a hull with two longitudinal sides, a bow and stern;
   a pair of water inlets located at the water level one in each side of the hull;
   a pair of oil booms extending forwards and outwards at both sides of the hull and having a lower portion submerged in the water and an upper portion above water level, each one of said booms being attached at the hull side closely adjacent the respective water inlets on the stern side thereof, in such a way that, when the water craft travels on the water, surface water is directed by the booms into said water inlets;
   a pair of water outlets located at the water level one in each side of the hull at a position towards the bow from the water inlets;
   a pair of conduits, each one providing a communication between one water inlet and one water outlet respectively, said conduit curving smoothly at each end in areas near said water inlets and water outlets; and
   means provided in said conduits for separating oil from the surface water directed into the conduit.

* * * * *